United States Patent Office 2,995,561
Patented Aug. 8, 1961

2,995,561
CERTAIN N - (3,5 - DIIODO - 4 - PYRIDONE-
ALKANOYL) - AMINOALKANOIC ACIDS
Ernst Habicht, Schaffhausen, Switzerland, assignor to Cilag-Chemie Limited, Schaffhausen, Switzerland, a Swiss company
No Drawing. Filed Dec. 29, 1959, Ser. No. 862,473
Claims priority, application Switzerland Jan. 9, 1959
4 Claims. (Cl. 260—295)

This invention relates to a new series of organic compounds. More particularly, the present invention concerns certain iodized acid amides, methods for their preparation and to pharmaceutical compositions containing such iodized acid amides which are useful as X-ray contrast agents.

The new iodized acid amides of this invention have the formula:

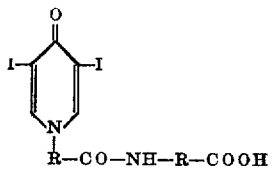

wherein the symbols R represent straight or branched alkylene radicals containing together not more than 4 carbon atoms.

The compounds of this invention have proven to be valuable X-ray contrast agents, particularly for bronchography and for salpingography. They can be administered in form of finely distributed suspensions with thickening agents, such as for instance carboxymethyl cellulose, carboxymethyl starch, polyethylene glycol, etc.

The new compounds have considerable advantages over the known unsubstituted amide of the 3,5-diiodo-4-pyridone-N-acetic acid (compare for instance U.S. Patent No. 2,064,944), these advantages being for instance the giving of denser shadows, better suitability for formation of suspensions, and a very low toxicity.

The advantages of the new compounds over X-ray contrast agents for bronchography already in use (e.g. 3,5-diiodo-4-pyridone-1-acetic acid and its propyl ester) are the following:

(1) Little irritating effect on the bronchial mucosa.
(2) Good capacity of adhesion and affinity to the mucous coat. A complete cast picture or an excellent lined picture is obtained on tight filling, whereas part expiration or resorption gives a clear representation of the mucosal relief.
(3) The viscosity, adjusted to a consistency comparable to not too liquid toothpaste, permits a good unimpeded instillation through the tube, avoids a filling of the alveoli, i.e., an easy flow into the lung periphery, and on fast elimination permits a clean and careful filling of single segments.

The most important advantage is an excellent contrasting effect and an extremely quick excretion.

As regards these two properties, the two following compounds were compared on the rabbit:

Compound A

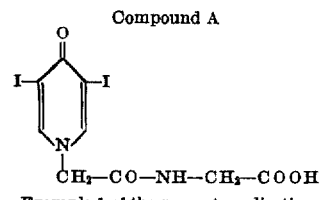

Example 1 of the present application

Compound B

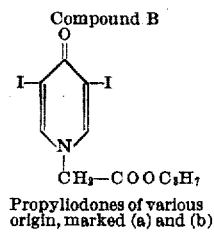

Propyliodones of various origin, marked (a) and (b)

The following results were obtained:

| | A | B (a) | B (b) |
|---|---|---|---|
| Contrast effect | ++++ | ++ | +. |
| Excretion | 6 hours | 8–11 days | 4–6 days. |

Thus, the advantage of compounds of the above Formula I is quite evident.

The new iodized acid amides can be produced in a simple manner by reacting an alkali metal salt of 3,5-diiodo-pyridone-(4) with a compound of the formula:

Hal—R—CO—NH—R—COOR'     II wherein Hal represents chlorine or bromine, and R' represents a lower alkyl radical such as for instance methyl or ethyl. The resulting esters of the formula

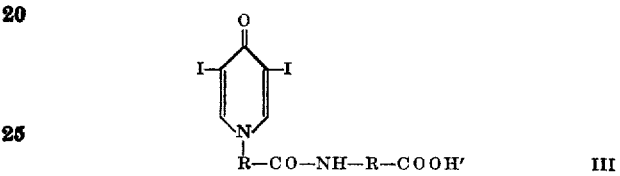

can be converted by means of careful alkaline hydrolysis into the respective free acid of the Formula I.

It is thus possible to react: 3,4-diiodo-4-pyridone and particularly its sodium salt with ethyl chloroacetyl glycinate, ethyl chloroacetyl alaninate, ethyl-α-bromopropionyl glycinate, ethyl-β-bromopropionyl glycinate, ethyl - β - bromopropionyl alaninate, ethyl - α - bromopropionyl alaninate.

The saponification of the resulting esters is preferably carried out by means of sodium hydroxide. A mixture of ethanol and water is used as solvent. The final point of saponification can easily be recognized by the complete dissolving of the initially insoluble ester.

The present invention likewise relates to X-ray contrast agents for the performance of bronchographies and hysterosalpingographies. The said X-ray contrast agents contain an aqueous suspension of an iodized acid amide of the formula:

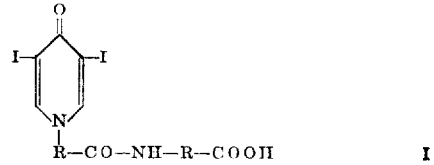

and one of the usual thickening agents such as one of those named below. The symbols R in the above formula have the same meaning as hereinbefore defined.

The iodized acid amides are used in their free form, i.e., not as a salt but as the free acid. Example 2 hereinbelow gives an exact description of how to prepare a 50 volume percent contrast suspension for bronchographical purposes. The indications of percent are to be understood throughout the specification as weight/volume indications.

Of course, various concentrations of iodized acid amides have to be used for the various purposes, such as for instance for bronchography or for hysterosalpingography. A 50% concentration is suited for the bronchography, whereby the concentration can also be diminished to 40% or increased to 60%. The hysterosalpingography permits the lowering of the concentration to 30%.

Example I (A) 122.7 g. of sodium salt of 3,5-diiodo-4-pyridone in 600 cc. of absolute dioxane are heated to boiling during 15 hours with 59.9 g. of ethyl chloroacetyl glycinate. After cooling, the whole is evaporated, the residue is stirred with water and then recrystallized from dioxane. 139 g. (equal to 85% of the theoretical value) of 3,5-diiodo-4-pyridone-N-acetic acid-N'-carbethoxymethyl-amide are obtained. The new compound melts at 151–153° C.

(B) 80 g. of the ester obtained according to paragraph A are heated with 150 cc. of 2N sodium hydroxide, 200 cc. of ethanol and 300 cc. of water until everything is dissolved (approximately 5 minutes). The resulting solution is filtered, and the filtrate is acidified with 2N hydrochloric acid. After washing with water, the precipitating fine crystals are filtered off with suction and then dried. The free acid of the formula

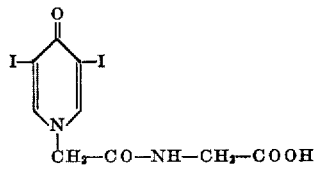

is obtained in a yield of 63 g. (equal to 84% of the theoretical value). This free acid melts at 222° C. with decomposition.

Example II 38 g. of chemically pure glucose are dissolved in 721 g. of freshly distilled water, and the resulting solution is filtered. 4 g. of pure medium viscous sodium carboxymethyl cellulose are now introduced into the filtrate while vigorously turbinating. Prior to introduction, the sodium carboxymethyl cellulose is dampened with 11 g. of twice distilled benzyl alcohol. The resulting clear solution is filtered through a glass filter, filled into closed containers, and sterilized while hot.

Subsequent to cooling, 2 g. of sorbitan polyoxyethylene laurinate and 500 g. of microcrystalline sterilized contrast substance of the formula

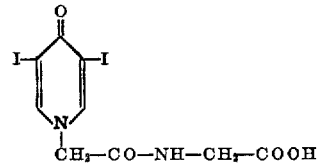

are given into the above solution. In order to obtain an even distribution of the contrast substance, a heavy speed stirrer is used. However, it is also possible to let the whole flow through a homogenizing apparatus under sterile conditions.

A contrast suspension obtained in this manner is ready for use in carrying out branchographies.

The said suspension contains 50% (weight/volume) of contrast substance. In other words each 100 cc. of solution contains 50 g. of contrast substance, or each 127.6 g. of suspension contains 50 g. of contrast substance.

For bronchographical purposes, the concentration of the contrast substance can also be reduced to 40% or increased to 60%.

It is also possible to use instead of carboxymethyl cellulose another thickener, such as for instance dextrane, carboxymethyl starch, polyvinyl pyrrolidone, polyvinyl alcohol, polyethylene glycol, etc.

As a rule, a lower viscous solution is used for the hysterosalpingography, i.e., in the present example, 2–3 g. of sodium carboxymethyl cellulose are used instead of 4 g. of sodium carboxymethyl cellulose. The concentration in contrast substance can be reduced to as low as 30%.

Example III 125 g. of sodium salt of 3,5-diiodo-4-pyridone in 600 cc. absolute dioxane are heated to boiling for 16 hours with 65 g. of ethyl chloroacetyl alaninate. This step is followed by evaporation, stirring of the residue with water and recrystallization from dioxane. 120 g. of the ester of the formula

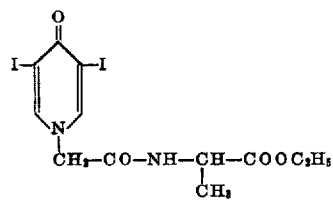

are obtained. Saponification of the ester is done as described in Example I, by means of sodium hydroxide in a mixture of ethanol/water. The free alanine derivative shows, when worked up in a manner analogous to that described in Example II, the same advantageous properties as the glycine derivative.

Example IV

When processing 125 g. of sodium salt of 3,5-diiodo-4-pyridone and 65 g. of ethyl-β-bromopropionyl glycinate in 600 cc. of dioxane in a manner analogous to that described in Example I, 75 g. of the ester of the formula

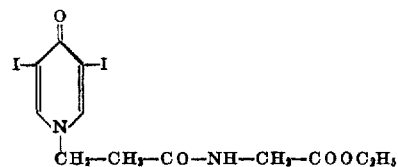

are obtained. Saponification thereof is done in the same manner as indicated in Example I. The free compound, i.e., the β-(3,5-diiodo-4-pyridonyl-1)-propionic acid-carboxymethylamide is worked into a 50% suspension in a manner analogous to that described in Example II. This suspension is very well suited for bronchographical purposes.

What I claim is:

1. New iodized acid amides of the general formula:

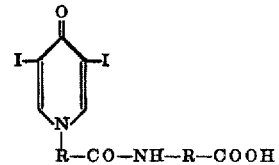

wherein the symbols R represent a member of the group consisting of straight and branched alkylene radicals whose carbon atoms are, in total, not more than 4 in number.

2. The new compound of the formula:

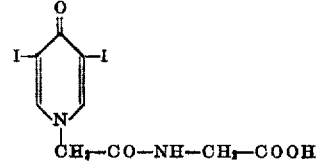

3. The new compound of the formula:

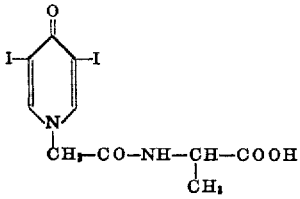

4. The new compound of the formula:
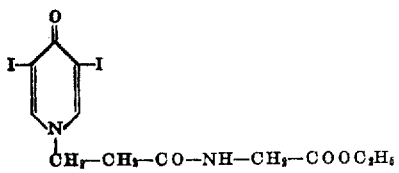
References Cited in the file of this patent
UNITED STATES PATENTS
| | | |
|---|---|---|
| 2,064,944 | Reitmann et al. | Dec. 22, 1936 |
| 2,505,634 | Archer | Apr. 25, 1950 |
| 2,606,922 | Papa et al. | Aug. 12, 1952 |
OTHER REFERENCES
Musante et al.: Chem. Abstracts, vol. 43, col. 5780 (1949).